(12) United States Patent
Koo et al.

(10) Patent No.: US 6,882,632 B1
(45) Date of Patent: Apr. 19, 2005

(54) METHOD AND APPARATUS FOR RELEASING SCH IN CDMA MOBILE COMMUNICATION SYSTEM

(75) Inventors: Chang-Hoi Koo, Songnam-shi (KR); Hyun-Seok Lee, Songnam-shi (KR); Dae-Gyun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 832 days.

(21) Appl. No.: 09/718,634

(22) Filed: Nov. 22, 2000

(30) Foreign Application Priority Data

Nov. 23, 1999 (KR) .......................................... 1999-52271

(51) Int. Cl.$^7$ ............................................. H04B 7/216
(52) U.S. Cl. ....................................... 370/335; 370/342
(58) Field of Search ................................ 370/328, 329, 370/335, 342; 455/455

(56) References Cited

U.S. PATENT DOCUMENTS

| | | | | |
|---|---|---|---|---|
| 6,377,809 B1 | * | 4/2002 | Rezaiifar et al. | ............ 455/455 |
| 6,473,419 B1 | * | 10/2002 | Gray et al. | ................. 370/349 |
| 6,490,268 B1 | * | 12/2002 | Lee et al. | .................... 370/342 |
| 6,714,524 B1 | * | 3/2004 | Kim et al. | ................... 370/335 |
| 6,728,365 B1 | * | 4/2004 | Li et al. | ..................... 379/329 |

* cited by examiner

Primary Examiner—Min Jung
(74) Attorney, Agent, or Firm—Dilworth & Barrese, LLP (57) ABSTRACT

A method of releasing a supplemental channel in a CDMA mobile communication system. Upon request of releasing the supplemental channel, a base station determines whether to transition from the current state to another state, generates a first message indicating release of the SCH and a next state to transit to, transmits the first message to a mobile station. Upon receipt of a second message in response to the first message from the mobile station, the base station releases the SCH, and transits to the next state.

58 Claims, 8 Drawing Sheets

(PRIOR ART)

METHOD AND APPARATUS FOR RELEASING SCH IN CDMA MOBILE COMMUNICATION SYSTEM

PRIORITY

This application claims priority to an application entitled "Method of Releasing SCH in CDMA Mobile Communication System" filed in the Korean Industrial Property Office on Nov. 23, 1999 and assigned Serial No. 99-52271, the contents of which are hereby incorporated by reference.

BACKGROUND OF THE INVENTION

1. Field of the Invention

The present invention relates generally to a method of establishing and releasing a SCH (Supplemental channel) in a CDMA (Code Division Multiple Access) mobile communication system, and in particular, to a method of directly transitioning from an active state to an idle state when an SCH is released.

2. Description of the Related Art

CDMA has been developed to IMT-2000 standards which provide services like transmission of high quality voice and moving pictures and Internet browsing as well as the conventional service of voice transmission.

Data transmission occurs in bursts, with idle states without any data transmission often occurring in the mobile communication system. The idle states are a control hold state, a suspended state, and a dormant state. The IMT-2000 mobile communication system assigns a dedicated channel only if data transmission occurs in a data communication service. Further, it additionally provides a packet data service in which SCHs are designated as dedicated to transmit a large amount of packet data. To do so, SCHs have high variable data rates.

In consideration of limited radio resources, base station capacity, and the power consumption of a mobile station, a dedicated traffic channel (DTCH) and a control channel are connected only while data is being transmitted and the DTCH is released if data transmission is discontinued for a predetermined time period. Communication is made on the common channel while the dedicated channel is released, to thereby increase use efficiency of radio resources. For this purpose, call processing is comprised of different states according to channel assignment and the presence or absence of channel status information.

Figure 1:
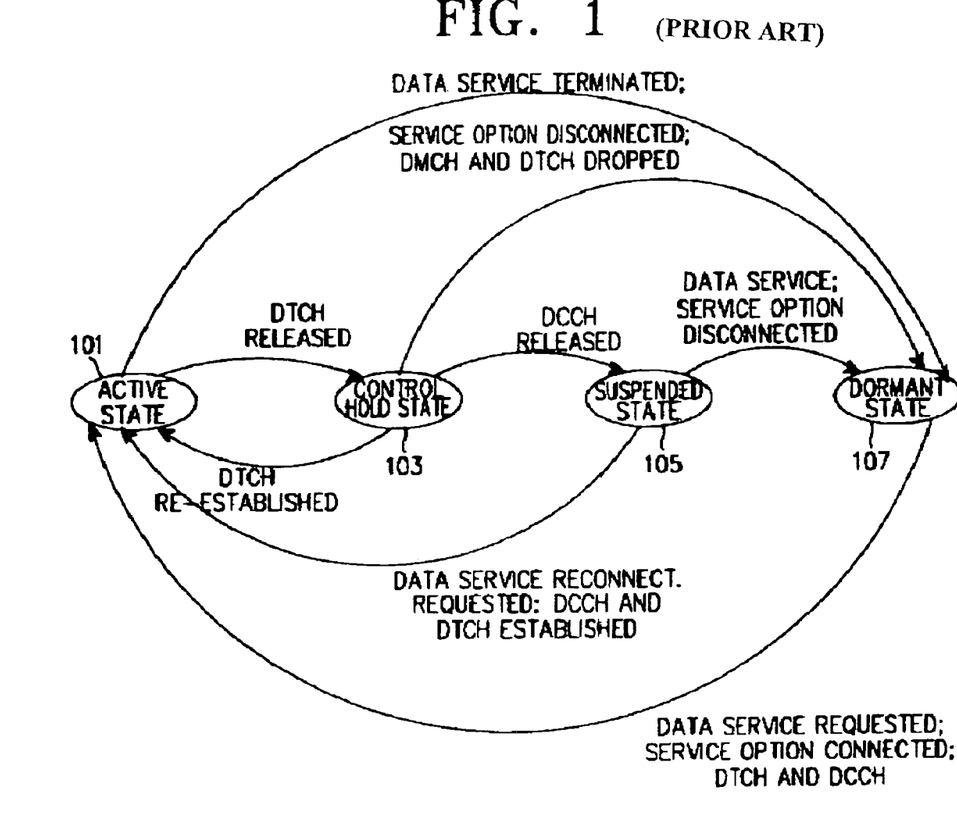
FIG. 1 illustrates a state transition diagram for packet data service in a conventional CDMA mobile communication system.

FIG. 1 is a state transition diagram for the packet service in a general mobile communication system.

Referring to FIG. 1, there are an active state 101, a control hold state 103, a suspended state 105, and a dormant state 107 for the packet service.

In the active state 101, input data is transmitted on a DTCH. Once a data service object connects a service option and initially enters the active state 101, a dedicated data channel is available and a base station and a mobile station performs initialization operations for RLP (Radio Link Protocol) and PPP (Point to Point Protocol). If data is not transmitted for a predetermined time period $T_{\_Active}$ in the active state 101, the DTCH is released and the control hold state 103 is entered. If a non-data transmission period of longer than $T_{\_Active}$ is expected based on an estimate of the amount of data that will be generated, a transition occurs from the active state 101 directly to the suspended state 105 or the dormant state 107, without passing through the control hold state 103.

In the control hold state 103, the base station and the mobile station preserve information about the service option, the RLP, and the PPP, and a dedicated control channel (DCCH) has been established. If transmit data is generated within a predetermined time $T_{\_Hold}$, the data service object reestablishes the DTCH to transmit the data and returns to the active state 101. On the other hand, if there is no transmit data until $T_{\_Hold}$ elapses, the DCCH is released and the suspended state 105 is entered. The control hold state 103 is also transitioned directly to the dormant state 107 without passing through the suspended state 105 if a non-data transmission period is expected to be longer than $T_{\_Hold}$ based on an estimated amount of data that will be generated.

In the suspended state 105, a fundamental channel (FCH), being a dedicated physical channel assigned to each mobile station, or the DCCH is released. Therefore, logical channels, the DCCH and the DTCH, are released. The mobile station communicates with the base station over a common signaling channel (CSCH) established on physical channels shared by a plurality of mobile stations, a paging channel and an access channel. The base station and the mobile station still preserve the information about the service option, the RLP, and the PPP in the suspended state 105. If user data is generated within a predetermined time $T_{\_Suspended}$ in the suspended state 105, the data service object reestablishes the DCCH and the DTCH concurrently and returns to the active state 101. On the contrary, if no data is generated for $T_{\_Suspended}$, the data service object transitions to dormant state 107.

In the dormant state 107, the service option is disconnected and the link-layer connection is held between an IWF (internetworking function) and the mobile station only in the data service. All dedicated logical channels are released and communication is conducted on common channels in this state. Upon request of data service in the dormant state 107, the service option is to connected, the DTCH and the DCCH are re-established, and the active state 101 is entered.

In summary, the DTCH, the DCCH, and the service option are connected in the active state 101, the DCCH and the service option are connected in the control hold state 103, only the service option is connected in the suspended state 105, and only the link layer connection is held between the IWF and the mobile station in the dormant state 107.

As stated above, SCHs are utilized in order to provide the high speed packet data service in the CDMA mobile communication system. As compared to a control channel or an FCH, an SCH transmits only user data and a DCCH or a fundamental channel (FCH) must be set up before the SCH is assigned. Hence, the SCH is set up only in the active state 101 as shown in FIG. 1. In other words, the active state 101 must be entered to exchange SCH messages. Even when the SCH is to be released due to the absence of pack data, another idle state must be transitioned to, with the active state 101 interposed.

Figure 2:
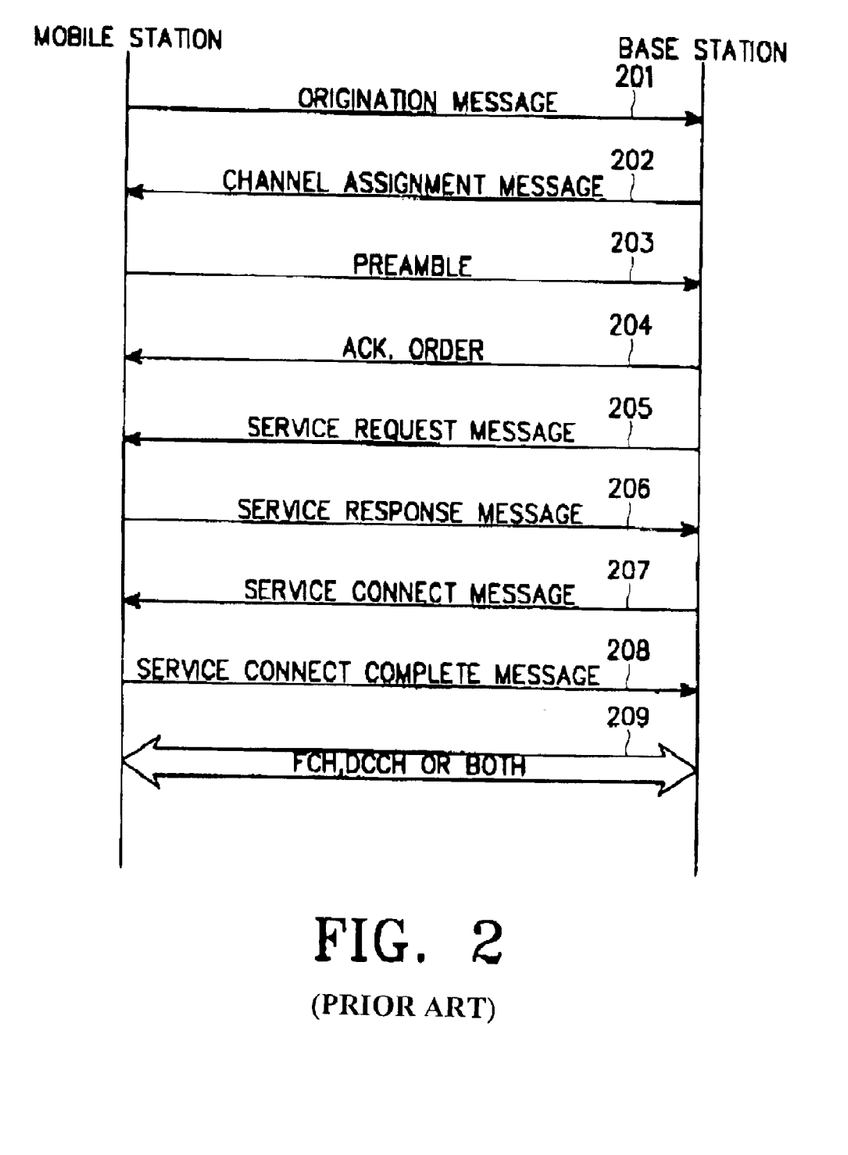
FIG. 2 illustrates a signal flow in a call set-up procedure in the conventional CDMA mobile communication system.

FIG. 2 illustrates the signal flow in a basic call set-up process, i.e., transition to the active state to set up a channel when a mobile station requests a call in the CDMA mobile communication system.

Referring to FIG. 2, the mobile station transmits an origination message requesting establishment of a dedicated channel to a base station on a reverse access channel (R-ACH) in step 201. Upon receipt of the origination message, the base station transmits a channel assignment message to the mobile station on a forward paging channel (F-PCH) in step 202. At the same time, the base station transmits null traffic on a channel with a corresponding orthogonal code. Upon receipt of the channel assignment message, the mobile station analyzes the null frame on the corresponding channel. If the mobile station confirms that the channel is successfully established, it transmits a preamble on its unique code channel to synchronize its timing to the base station during channel assignment in step 203. If bidirectional dedicated channels are successfully established, the base station transmits an acknowledgment (Ack) order in step 204. Upon receipt of the Ack order, the mobile station discontinues transmission of the preamble and becomes capable of transmitting a message on a DTCH (an FCH or a control channel).

In steps 205 to 208, service negotiations for the current available transmission environment are carried on between the base station and the mobile station to provide quality service to the users. After the negotiations are over, the channel assignment procedure ends in step 209.

Figure 3A:
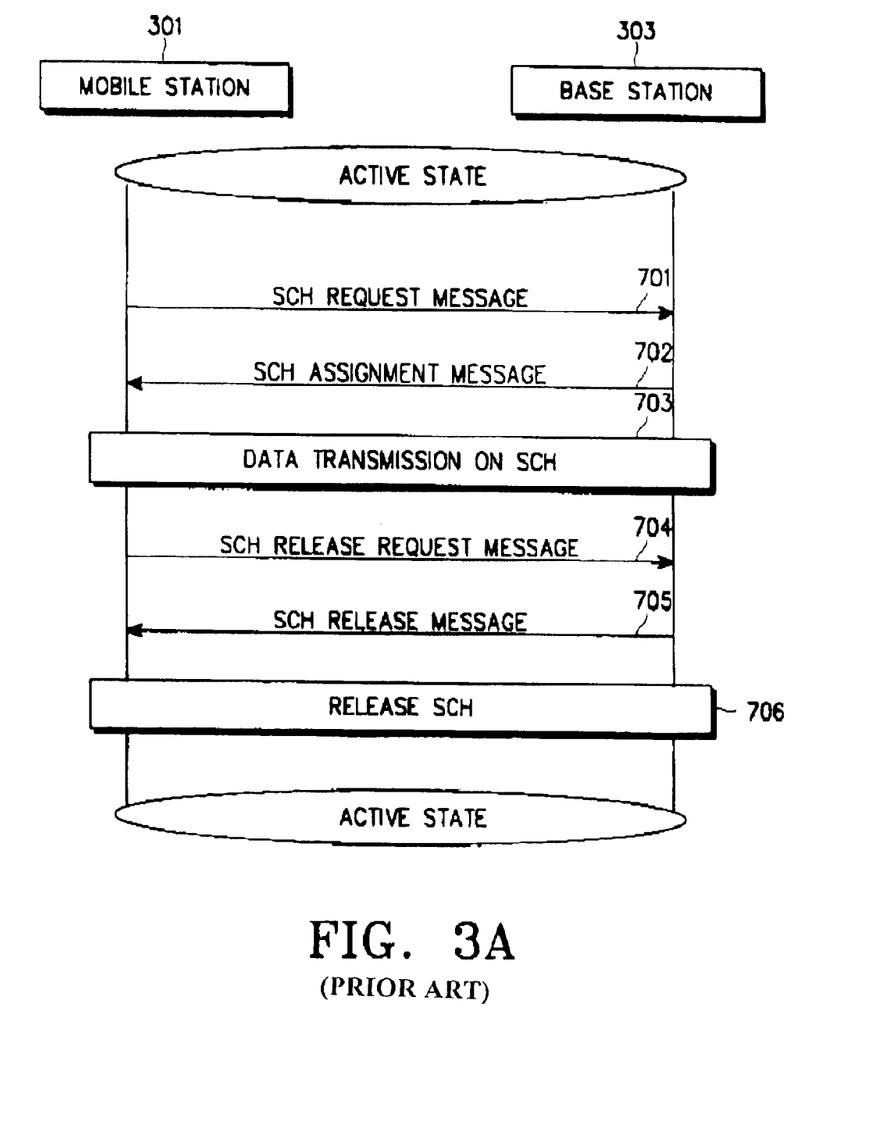
FIG. 3A illustrates a signal flow between a mobile station and a base station in a conventional SCH establishing and releasing procedure in the case that the mobile station requests establishment of an SCH.
Figure 3B:
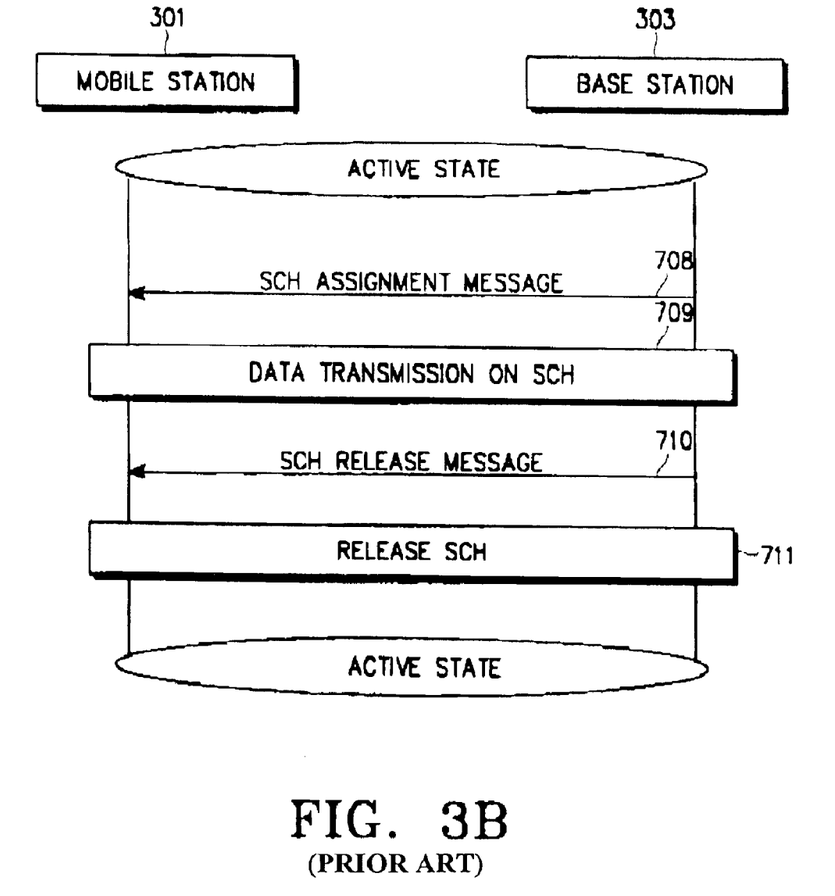
FIG. 3B illustrates a signal flow between the mobile station and the base station in another conventional SCH establishing and releasing procedure in the case that the network requests establishment of the SCH.

FIGS. 3A and 3B are signal flows in SCH establishment and release procedures in the active state, separately upon request of a mobile station and upon request of the network.

Referring to FIG. 3A, the mobile station 301 generates an SCH request message to the base station 303 in step 701, as constructed below in Table 1.

TABLE 1

| Field | Length (bits) |
|---|---|
| SIZE_OF_REQ_BLOB | 4 |
| REQ_BLOB | 8 × SIZE REQ BLOB |
| USE_SCRM_SEQ_NUM | 1 |
| SCRM_SEQ_NUM | 0 or 4 |
| REF_PN | 0 or 9 |
| PILOT_STRENGTH | 0 or 6 |
| NUM_ACT_PN | 0 or 3 |

If NUM_ACT_PN is included, the mobile station 301 shall include NUM_ACT_PN occurrences of the following record:

| | |
|---|---|
| ACT_PN_PHASE | 15 |
| ACT_PILOT_STRENGTH | 6 |
| NUM_NGHBR_PN | 0 or 3 |

If NUM_NGHBR_PN is included, the mobile station 301 shall include NUM_NGHBR_PN occurrences of the following record:

| | |
|---|---|
| NGHBR_PN_PHASE | 15 |
| NGHBR_PILOT_STRENGTH | 6 |
| RES_INFO_INCL | 1 |
| CH_IND | 0 or 3 |
| BLOB | 0 or 7 |

If the mobile station 301 wants the packet service, it transmits the SCH request message to the base station 303 on a traffic channel (a control channel or an FCH). The REQ_BLOB field shown in Table 2 indicates the use duration of the requested SCH.

Upon receipt of the SCH request message, the base station 303 checks physical resources for SCHs. If there is an available SCH, the base station transmits an SCH assignment message to the mobile station 301 in step 702. If the mobile station 301 operates in accordance with an IS-95B protocol, the SCH assignment message is generated in the format shown in Table 2.

TABLE 2

| Field | Length (bits) |
|---|---|
| USE_RETRY_DELAY | 1 |
| RETRY DELAY | 0 or 8 |
| REV_INCLUDED | 1 |

Only if REV_INCLUDED is set to '1', the following record is included:

| | |
|---|---|
| REV_DTX_DURATION | |
| EXPL_REV_START_TIME | 4 |
| REV_START_TIME | 1 |
| USE_REV_DURATION | 0 or 6 |
| REV_DURATION | 1 |
| USE_REV_HDM_SEQ | 0 or 8 |
| REV_SINKED_HDM_SEQ | 1 |
| NUM_REV_CODES | 0 or 2 |
| USE_T_ADD_ABORT | 3 |
| USE_SCRM_SEQ_NUM | 1 |
| SCRM_SEQ_NUM | 1 |
| REV_PARMS_INCLUDED | 0 or 4 |
| T_MULCHAN | 1 |
| BEGIN_PREAMBLE | 0 or 3 |
| RESUME_PREAMBLE | 0 or 3 |
| | 0 or 3 |
| FOR_INCLUDED | 1 |

Only if FOR_INCLUDED is set to '1', the following record is included:

| | |
|---|---|
| FOR_SUP_CONFIG | 2 |
| EXPL_FOR_START_TIME | 1 |
| FOR_START_TIME | 0 or 6 |
| USE_FOR_DURATION | 1 |
| FOR_DURATION | 0 or 8 |
| USE_FOR_HDM_SEQ | 1 |
| FOR_LINKED_HDM_SEQ | 0 or 2 |

Only if FOR_INCLUDED is set to '1' and FOR_SUP_CONFIG is set to '10' or '11', the following fields and records are included.

| | |
|---|---|
| NUM_SUP_PILOTS | 3 |
| NUM_FOR_SUP | 3 |

Only if FOR_INCLUDED is set to '0' and FOR_SUP_CONFIG is set to '10' or '11', NUM_SUP_PILOTS occurrences of the following record are included.

| | |
|---|---|
| PILOT_PN | 9 |
| EXPL_CODE_CHANE | 1 |

If EXPL_CODE_CHAN is set to '1', NUM_FOR_SUP occurrences of the following field are included for each PILOT_PN.

| SUP_CODE_CHAN | 0 or 8 |
|---|---|

If EXPL_CODE_CHAN is set to '0', the following field is included.

| BASE_CODE_CHAN | 0 or 8 |
|---|---|

Upon receipt of the SCH assignment message, the mobile station 301 transmits data on the SCH in step 703. After transmitting the intended data, the mobile station 301 transmits an SCH release request message to the base station 303 in step 704. The SCH release request message is generated in the same format as shown in Table 1, except that an SCH release code is in the REQ_BLOB field. At present, the SCH, the FCH, and the DCCH are established. That is, the base station 303 and the mobile station 301 are in the active state 101. Upon receipt of the SCH release request message, the base station 303 transmits an SCH release message to the mobile station 301 in step 705 and releases the SCH in step 706. Since the FCH and the DCCH are still connected, the base station 303 and the mobile station 301 remain in the active state 101.

Referring to FIG. 3B, when packet data is generated from the network (not shown), the base station 303 transmits the SCH assignment message to the mobile station 301 in step 708. Upon receipt of the SCH assignment message, the mobile station 301 transmits data on an assigned SCH in step 709. The base station 303 and the mobile station 301 are in the active state and at present, the SCH, the FCH, and the DCCH are established. If no more data is generated from the network, the base station 303 transmits the SCH release message to the mobile station 301 in step 710 and releases the SCH in step 711. The FCH and the DCCH are still connected between the base station 303 and the mobile station 301. Therefore, the base station 303 and the mobile station 301 remain in the active state 101, despite the absence of transmit data. To transition to the control hold state 103, the suspended state 105, or the dormant state 107, the mobile station 301 and the base station 303 must carry on negotiations. That is, the SCH is released and the active state 101 is continued. Transition to another state occurs by exchanging messages for the transition between the mobile station 301 and the base station.

As described above, although the SCH is released, the FCH or the DCCH is still connected, i.e., the active state 101 is continued. In this state, if no user data is transmitted on either of the FCH and the DCCH, it is preferable that the active state 101 transitions to the control hold state 103, the suspended state 105, or the dormant state 107 as soon as possible to increase the use efficiency of radio resources.

In the typical CDMA mobile communication system, when data transmission on the SCH is discontinued, the active state is kept on. For transition to the control hold state, the suspended state, or the dormant state, the mobile station and the base station must exchange messages associated with the state transition. Therefore, radio resources are occupied despite discontinued data transmission.

SUMMARY OF THE INVENTION

It is, therefore, an object of the present invention to provide a method and apparatus for transitioning from an active state directly to a control hold state, a suspended state, or a dormant state when an SCH is released in the active state in a CDMA mobile communication system.

The above object can be achieved by providing a method and apparatus for releasing a supplemental channel in a CDMA mobile communication system. Upon request of releasing the supplemental channel, a base station determines whether to transition from the current state to another state, generates a first message indicating release of the SCH and the next state to transition to, transmits the first message to a mobile station. The mobile station determines whether it has received the first message from the base station during packet data communication on the supplemental channel. Upon receipt of the first message, it analyzes the first message, releases the SCH, and continues the current state or transitions to the next state. Then, the mobile station transmits the second message to the base station. Upon receipt of the second message from the mobile station, the base station releases the SCH, and transitions to the next state.

BRIEF DESCRIPTION OF THE DRAWINGS

The above and other objects, features and advantages of the present invention will become more apparent in view of the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Listed below are the definitions of messages exchanged between the mobile station 301 and the base station 303 to transition from the active state 101 directly to the control hold state 103, the suspended state 105, or the dormant state 107 if an SCH is released in the active state 101.

An extended SCH assignment message as used for assignment of the SCH is constructed in the format illustrated by Table 3 below.

TABLE 3

| Field | Length (bits) |
|---|---|
| START_TIME_UNIT | 3 |
| REV_DTX_DURATION | 4 |
| USE_T_ADD_ABORT | 1 |
| USE_SCRM_SEQ_NUM | 1 |
| SCRM_SEQ_NUM | 0 or 4 |
| RES_INFO_INCL | 1 |
| FPC_PRI_CHAN | 0 or 1 |
| RPC_CHANNEL | 0 or 1 |
| CH_IND | 0 or 3 |
| BLOB | 0 or 7 |
| REV_ASSIGN_INCLUDED | 1 |

The base station shall include the following four fields if REV_ASSIGN_INCLUDED is set to 1.

| | |
|---|---|
| REV_SCH_ID | 2 |
| REV_DURATION | 4 |
| REV_START_TIME | 6 |
| RATE | 4 |
| FOR_CFG_INCLUDED | 1 |

The base station shall include the following fields if FOR_CFG_INCLUDED is set to 1.

| | |
|---|---|
| FOR_SCH_ID | 2 |
| NUM_REC | 4 |

(NUM_REC+1) occurrences of the following record:

| | |
|---|---|
| SCCL_INDEX | 4 |
| FOR_SCH_RATE | 4 |
| NUM_SUP_SHO | 3 |

(NUM_SUP_SHO+1) occurrences of the following fields.

| | |
|---|---|
| PILOT_PN | 9 |
| RECORD_LEN | 0 or 3 |
| TYPE_SPECIFIC_FIELDS | 0 or 8 × RECORD_LEN |
| FOR_SCH_CC_INDEX | 11 |
| FOR_ASSIGN_INCLUDED | 1 |

The base station shall include the following four fields if FOR_ASSIGN_INCLUDED is set to '1'.

| | |
|---|---|
| FOR_SCH_ID | 2 |
| FOR_DURATION | 4 |

-continued

| | |
|---|---|
| FOR_START_TIME | 6 |
| SCCL_INDEX | 4 |
| FPC_INCL | 1 |
| FPC_MODE | 0 or 3 |
| FPC_OLPC_SCH_M_INCL | 0 or 1 |
| FPC_SEC_CHAN | 0 or 2 |
| FPC_SCH_M_FER | 0 or 5 |
| FPC_SCH_INIT_M_SETPT | 0 or 8 |
| FPC_SCH_MIN_M_SETPT | 0 or 8 |
| FPC_SCH_MAX_M_SERTP | 0 or 8 |
| NUM_SUP | 0 or 2 |

NUM_SUP occurrences of the following fields are included.

| | |
|---|---|
| SCH_ID | 2 |
| FPC_SCH_FER | 5 |
| FPC_SCH_INIT_SETPT | 8 |
| FPC_SCH_MIN_SETPT | 8 |
| FPC_SCH_MAX_SETPT | 8 |
| FPC_THRESH_SCH_INCL | 0 or 1 |
| FPC_SETPT_THRESH_SCH | 0 or 8 |

The extended SCH assignment message shown in Table 3 can assign forward and reverse SCHs and includes Walsh codes for the SCHs. The conventional SCH request message is still used in the present invention when the mobile station requests an SCH.

Table 4 lists the message fields of an extended release message transmitted by the base station for state transition. The extended release message is newly detained in view of the introduction of a MAC (Media Access Control) layer to support the packet data service.

TABLE 4

| | |
|---|---|
| FPC_PRI_CHAN | 1 |
| RPC_CHANNEL | 1 |
| CH_IND | 3 |
| CON_REF_INCL | 1 |
| CON_REF | 0 or 8 |
| SCR_SEQ_INCL | 1 |
| SCR_SEQ | 0 or 4 |
| GATING_RATE_INCL | 1 |
| PILOT_GATING_RATE | 0 or 2 |
| BLOB | 7 |

FPC_PRI_CHAN: this field indicates a forward channel by which an inner loop power control is performed and this field is set for an FCH, except for the case that only a DCCH is connected.

RPC_CHANNEL: this field indicates a channel that transmits power control bits.

CH_IND: this field indicates the type of a physical channel to be released, i.e., an FCH, a DCCH, both the FCH and the DCCH, or a reverse pilot channel. For example, CH_IND is set to 010 for a DCCH, 100, for a reverse channel, 101 for an FCH and the reverse pilot channel, 110 for the DCCH and the reverse pilot channel, and 111 for the FCH, the DCCH, and the continuous reverse pilot channel.

CON_REF_INCL: this field indicates whether CON_REF is included in the message.

CON_REF: this field has a mobile station-specific value to indicate a service option to be connected.

SCR_SEQ: this field is used to discriminate between the suspended state 105 from the dormant state 107 in a signaling layer.

GATING_RATE_INCL: this field indicates whether PILOT_GATING_RATE is included in the message.

PILOT_GATING_RATE: this field provides a gating rate for gated transmission, 1, ½, or ¼.

BLOB: the MAC layer directly uses this field. BLOB is comprised of logical resources (DTCH and DMCH), SO, SR, and PURGE_SR and includes first-hand information about MAC state transition.

A receiver, receiving the extended release message, can decide as to what state it will transition to after the SCH is released by analyzing the extended release message. If CH_IND is not 0 and at least one of CON_REF_INCL, CON_REF, SCR_SEQ_INCL, and SCR_SEQ is not 0, the suspended state 105 is entered after the SCH is released. If CH_IND is not 0, at least one of CON_REF_INCL, CON_REF, SCR_SEQ_INCL, and SCR_SEQ is not 0, and either of GATING_RATE_INCL and PILOT_GATING_RATE is not 0, the control hold state 103 is entered and if all of the above seven fields are set to 0s, the dormant state 107 is entered.

An extended release mini message may be used instead of the extended release message shown in Table 4. The extended release mini message is 5 ms in duration and used only if the active state 101 is transitioned from the control hold state 103. The extended release mini message includes only the CH_IND field and the BLOB field because MAC state transition occurs between dedicated channel-having states and thus there is no need for any other field.

TABLE 5

| Field | Length (bits) |
| --- | --- |
| CH_IND | 3 |
| BLOB | 7 |

The messages defined as Table 4 and Table 5 are directed from the base station to the mobile station to release a channel. The base station may transmit the messages independently or as a response upon receipt of a channel release request message from the mobile station. Prior to transmitting the messages shown in Table 4 and Table 5 as response messages for the channel release request message, the base station must receive a peer-to-peer resource control message or a peer-to-peer resource control mini message, in the formats shown in Table 6 and Table 7, respectively.

TABLE 6

| Field | Length (bits) |
| --- | --- |
| REQ_BLOB | 16 |

TABLE 7

| Field | Length (bits) |
| --- | --- |
| BLOB | 13 |

SCH release & continuation of the active state or state transition to the control hold state, the suspended state, or the dormant state is requested via the peer-to-peer resource control message, whereas SCH release & continuation of the active state or state transition to the control hold state, the suspended state, or the dormant state is requested via the peer-to-peer resource control mini message. The above two messages are directed from the mobile station to the base station to request channel release. The mobile station is authorized to only request channel release, not to decide on channel release. The peer-to-peer resource control mini message is 5 ms in duration and transmitted on a traffic channel only.

Figure 4:
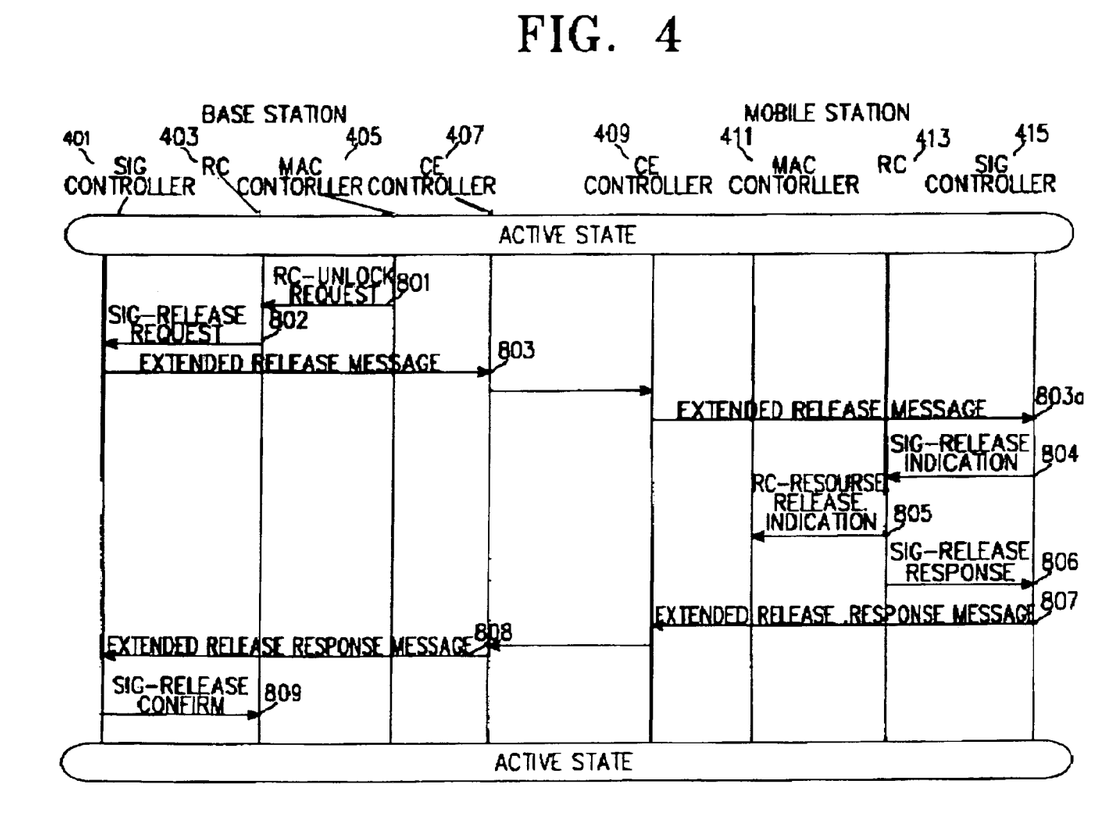
FIG. 4 illustrates a signal flow between the mobile station and the base station in a call process for transition of an active state to a control hold state, a suspended state, or a dormant state in the case that the base station generates an SCH release request according to an embodiment of the present invention.
Figure 5:
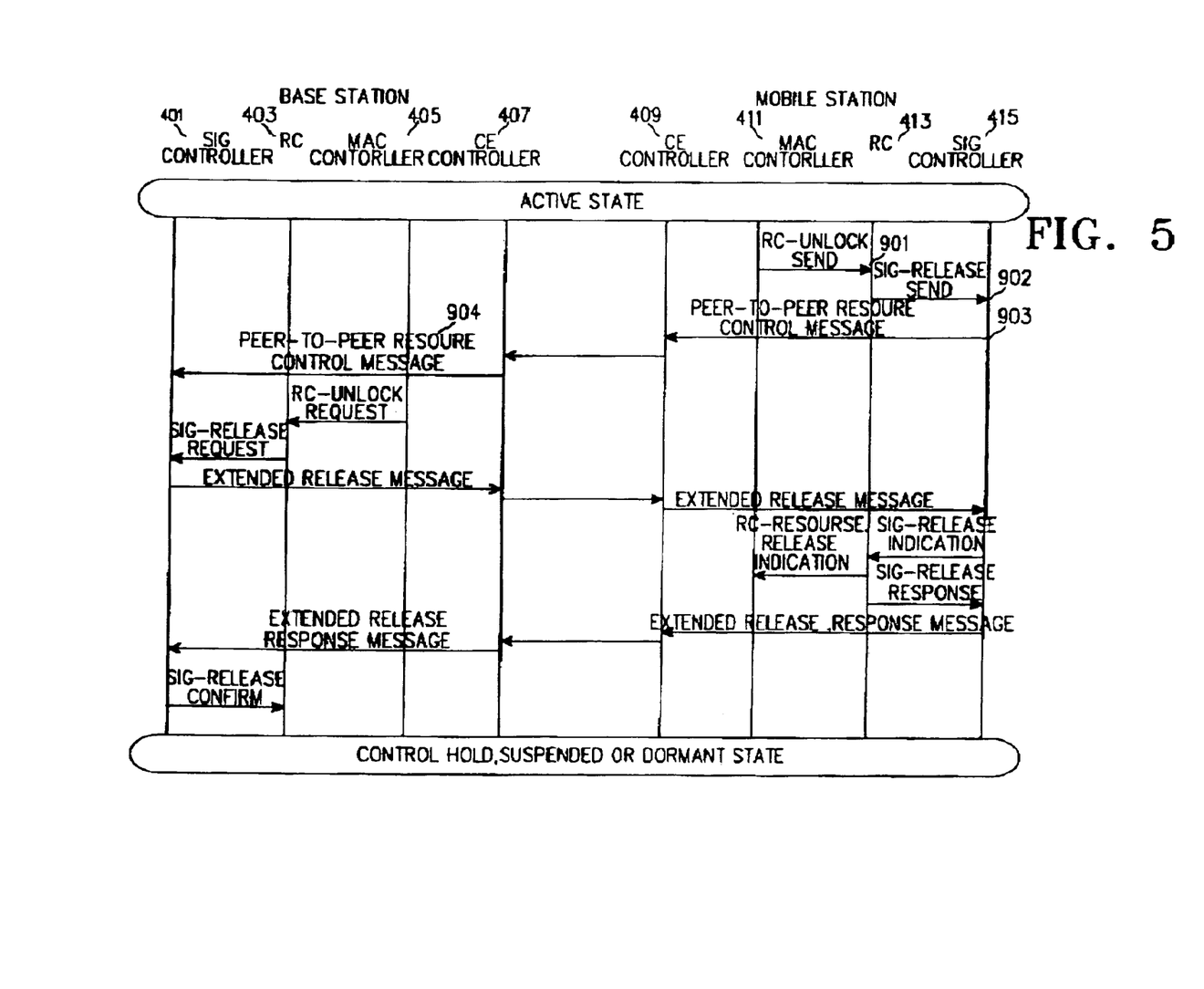
FIG. 5 illustrates a signal flow between the mobile station and the base station in a call process for transition of the active state to the control hold state, the suspended state, or the dormant state in the case that the mobile station generates an SCH release request according to the embodiment of the present invention.

Either of the base station and the mobile station can generate an SCH release request if packet data is not transmitted for a predetermined time. FIG. 4 is a signal flow diagram illustrating the case that the base station issues the SCH release request according to the embodiment of the present invention and FIG. 5 is a signal flow diagram illustrating the case that the mobile station issues the SCH release request according to the embodiment of the present invention.

Referring to FIG. 4, reference numerals 401, 403, 405, and 407 denote a signaling layer controller (SIG controller), a resource controller (RC), a MAC controller, and a channel element (CE) controller in the base station, respectively. Reference numerals 409, 411, 413, and 415 respectively denote a CE controller, a MAC controller, an RC, and a SIG controller in the mobile station.

The SIG controllers 401 and 415 generate messages associated with call processing and interpret the call processing messages. The RCs 403 and 413 maintain and controls the states of all physical and logical resources related with services. The RC 403 distributes or releases resources and the RC 413 performs base station commands. The MAC controllers 405 and 411, including state transition modules classified according to idle periods of data in the packet data service, trigger state transition-associated operations. The CE controllers 407 and 409 perform all physical operations (e.g., encoding and modulation/demodulation) needed to transmit signals.

If transmission of packet data is discontinued, the MAC controller 405 transmits an RC-unlock request signal as a primitive for releasing an SCH to the RC 403, requesting release of the SCH or release of an FCH or a control channel as well as release of the SCH in step 801. That is, for state transition by releasing the SCH along with the FCH or the control channel, the MAC controller 405 transmits the RC-unlock request signal to the RC 403 to transition from the active state 101 to the control hold state 103, the suspended state 105, or the dormant state 107. The MAC controller 405 must determine whether to continue the active state 101 or transition to the control hold state 103, the suspended state 105, or the dormant state 107 by checking the presence or absence of data to be transmitted on the FCH or the DCCH, in step 801. Both the FCH and the DCCH are used to provide circuit service and packet data service. In the case where the SCH is released due to discontinuation of the packet data transmission, the circuit service is provided in the active state. On the other hand, if the packet data transmission is discontinued during only the packet service on the supplemental channel in progress, it is not necessary to maintain the active state and thus the active state is transitioned to the control hold state, the suspended state, or the dormant state. If transmit data is not generated during data communication in progress on the DCCH and a signal control channel (SCCH) in the active state or the control hold state, the suspended state or the dormant state is entered. The RC 403 transmits a SIG-release request signal to the SIG controller 401 in step 802 and the SIG controller 401 transmits an extended release message in the format shown in Table 4 to the CE controller 407 in step 803. The extended release message has information about a state to which the active state 101 transitions, that is, information about the FCH or the DCCH to be released and information about a logical channel mapped on a physical channel, as stated before. The CE controller 407 transmits the extended release message to the CE controller 409 of the mobile station 301 on the physical channel.

The CE controller 409 transmits the extended release message to the SIG controller 415 in step 803a and the SIG controller 415 analyzes the extended release message and generates a SIG-release indication to the RC 413 in step 804. The RC 413 updates information about corresponding resources to be released, transmits an RC-resource release indication to the MAC controller 411 in step 805, and transmits a SIG-release response signal to the SIG controller 415 in step 806. Here, the SIG controller 415 releases the SCH and the RC 413 and the MAC controller 411 releases the FCH or the DCCH as necessary. The SIG controller 415 transmits an extended release response message to the CE controller 409 in step 807.

The SIG controller 401 receives the extended release response message via the mobile station CE controller 408 and base station CE controller 407 in step 808 and transmits a SIG-release confirm signal to the RC 403 in step 809, thereby releasing the SCH and completing the state transition. That is, the base station 303 releases the SCH and transitions to the same state as the mobile station 301.

As described above, the base station determines which state it will transition to by checking the presence or absence of data to be transmitted on the FCH and the DCCH and the mobile station transitions to the corresponding state by analyzing the SCH release message having information about the determined state transition.

The fields CH_IND, CON_REF-INCL, CON_REF, SCR_SEQ_INCL, SCR_SEQ, GATING_RATE_INCL, PILOT_GATING_RATE, and BLOB of Table 4 specify how the mobile station transitions. For transition to the control hold state, the 5-ms mini message of Table 5 can be used instead of the message of Table 4. The fields CH_IND and BLOB of Table 5 indicate release of an SCH & continuation of the active state or transition to the control hold state.

Referring to FIG. 5, the MAC controller 411 transmits an RC-unlock send signal to the RC 413, requesting release of an SCH, when no transmit packet data is generated in step 901. The RC-unlock send signal is used to transition from the active state 101 directly to the control hold state 103, the suspended state 105, or the dormant state 107. The RC 413 transmits a SIG-release send signal to the SIG controller 415 in step 902 and the SIG controller 415 transmits the peer-to-peer resource control message as defined in Table 6 to the SIG controller 401 of the base station 303 via the CE controller 409 of the mobile station 301 and the CE controller 407 of the base station 303 in steps 903 and 904. The SIG controller 401 releases the SCH and transitions to another state by performing the procedure illustrated in FIG. 4. If the mobile station wants to stay in the active state 101 or to request transition to the control hold state 103, the peer-to-peer resource control mini message can be transmitted instead of the peer-to-peer resource control message.

Figure 6A:
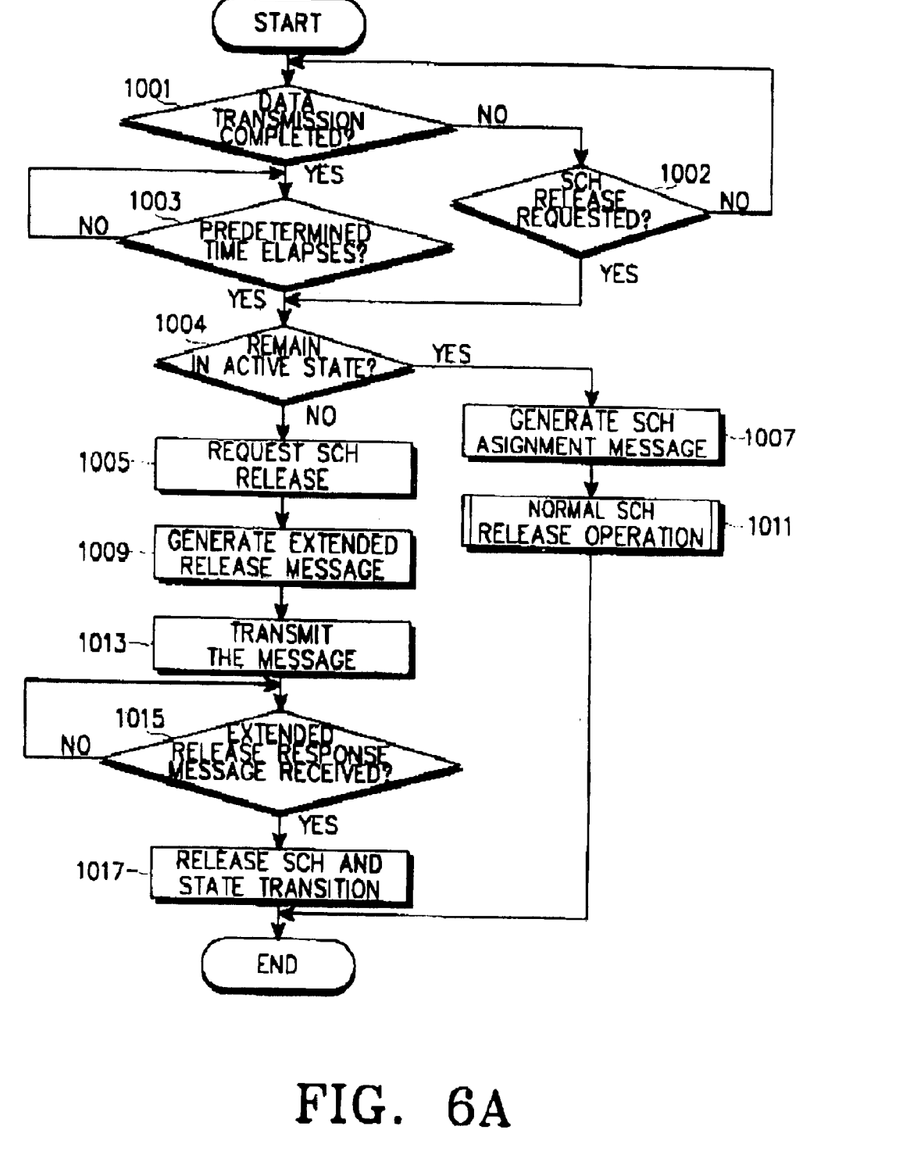
FIG. 6A is a flowchart illustrating an SCH releasing and state transition procedure in the base station according to the embodiment of the present invention.
Figure 6B:
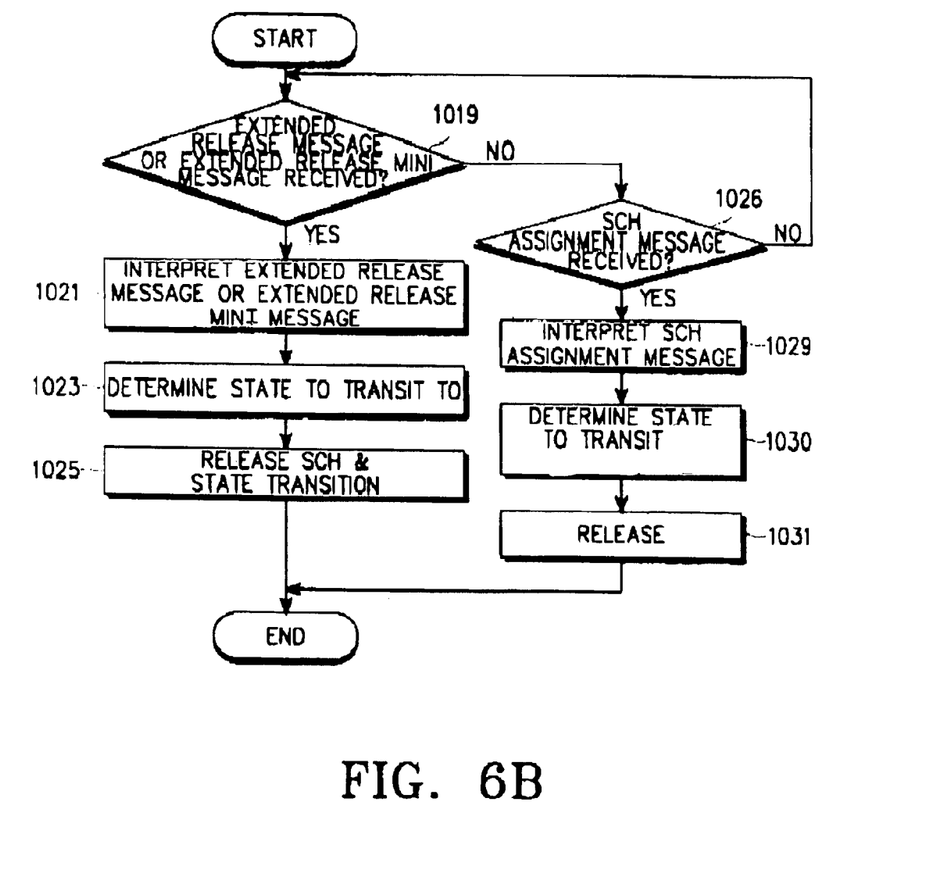
FIG. 6B is a flowchart illustrating an SCH releasing and state transition procedure in the mobile station according to the embodiment of the present invention.

FIG. 6A is a flowchart illustrating an SCH release and state transition procedure in the base station according to the embodiment of the present invention and FIG. 6B is a flowchart illustrating an SCH release and state transition procedure in the mobile station according to the embodiment of the present invention.

Referring to FIG. 6A, the base station 303 determines whether the MAC controller 405 has completed data transmission on the SCH in step 1001. Upon completion of the data transmission, the MAC controller 405 determines whether a non-data transmission period has exceeded a predetermined time period in step 1003. If packet data transmission is discontinued longer than the predetermined time period, the MAC controller 405 decides whether to continue the active state or transition to another state by checking the presence or absence of data on an FCH or a DCCH in step 1004. The decision is made with the following considerations. Both the FCH and the DCCH are used to provide circuit service and packet data service. If an SCH is released due to the absence of transmit packet data in this state, the circuit service continues in the active state. On the other hand, if no packet data is generated while only the packet service on the SCH is in progress, it is unnecessary to continue the active state. Hence, the active state is transitioned from to the control hold state, the suspended state, or the dormant state. In a case where no data is generated during data communication on a DCCH and an SCCH in the active state or the control hold state, the suspended state or the dormant state is entered.

If it is determined that the active state is to be continued in step 1004, the MAC controller 405 generates an SCH assignment message in step 1007 and transmits the SCH assignment message to the mobile station 301 in step 1011. Assignment and release of the SCH is determined depending on the value of REV_DURATION in the SCH assignment message. Then, the SCH is released and the active state 101 is continued in the procedure shown in FIGS. 3A and 3B.

On the other hand, if state transition is determined in step 1004, the MAC controller 405 transmits the RC-unlock request signal to the RC 403, requesting release of the SCH and state transition in step 1005. The RC 403 transmits the SIG-release request signal to the SIG controller 401. The SIG controller 401 generates the extended release message or the extended release mini message in response to the SIG-release request signal in step 1009 and transmits the generated message to the mobile station 301 in step 1013. In step 1015, the SIG controller 401 monitors the CE controller 407 to check whether the extended release response message has been received from the mobile station 301. Upon receipt of the extended release response message, the SIG controller 401 transmits the SIG-release confirm signal to the RC 403, to thereby releasing the SCH and transitioning to the control hold state 103, the suspended state 105, or the dormant state 107, in step 1017.

Meanwhile, if the data transmission is in progress, the base station 303 determines whether an SCH request has been received from the mobile station 301 through the CE controller 407 in step 1002. Upon receipt of the SCH release request from the mobile station 301, the base station goes to step 1004.

Referring to FIG. 6B, the SIG controller 415 of the mobile station 301 periodically monitors the CE controller 409 to check whether a message has been received from the base station in step 1019. It is to be noted that the message is a message for releasing an SCH. Upon receipt of the message from the base station 303, the mobile station 301 determines whether the message is an extended release message or an extended release mini message in step 1019. If the received message is one of the extended release message and the extended release mini message, the SIG controller 415 interprets the received message in step 1021, and determines a state to transition to and transmits the SIG-release indication to the RC 413 in step 1023. The RC 413 transmits the RC-resource indication to the MAC controller 411 and the SIG-release response signal to the SIG controller 415, to thereby release the SCH and transition to the corresponding state in step 1025. The SIG controller 415 transmits the extended release response message to the CE controller 409.

If the received message is not either of the extended release message and the extended release mini message in step 1019, the mobile station 301 determines whether the message is a supplemental assignment message in step 1026. In the case of the SCH assignment message, the mobile station 301 determines state to transit in step 1030 and then releases the SCH in step 1031. That is, after releasing the SCH, the mobile station 301 remains in the active state.

In accordance with the present invention, the active state is directly transitioned to the control hold state, the suspended state, or the dormant state when an SCH is released in the active state. As a result, radio resources are saved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of releasing an SCH (Supplemental Channel) in a base station of a CDMA mobile communication system, comprising the steps of:
   determining whether to transition from the current state to another state upon request of releasing the SCH;
   generating a first message indicating release of the SCH and a next state to transition to and transmitting the first message to a mobile station; and
   releasing the SCH and transitioning to the next state upon receipt of a second message from the mobile station, in response to the first message.

2. The method of claim 1, wherein the first message is an extended release message.

3. The method of claim 2, wherein the extended release message comprises:
   an FPC_PRI_CHAN field indicating a forward channel by which forward inner-loop power control is performed;
   an RPC_CHANNEL field indicating a channel to transmit power control bits;
   a CH_ND field indicating a type of a physical channel to be released;
   a CON_REF field indicating a connection of a service option to a specific mobile station;
   a CON_REF_INCL field indicating whether the CON_REF field is included in the extended release message;
   an SCR_SEQ field for discriminating a suspended state from a dormant state in a signaling layer;
   an SCR_SEQ_INCL field indicating whether the SCR_SEQ field is included in the extended release message;
   a PILOT_GATING_RATE field indicating a gating rate;
   a GATE_RATE_INCL field indicating whether the PILOT_GATING_RATE field is included in the extended release message; and
   a BLOB field including firsthand information about MAC (Medium Access Control) state transition.

4. The method of claim 3, wherein if CH_IND is not 0 and at least one of CON_REF_INCL, CON_REF, SCR_SEQ_INCL, and SCR_SEQ is not 0, the extended release message indicates a transition to the suspended state.

5. The method of claim 3, wherein if none of CH_IND, GATING_RATE_INCL, and PILOT_GATING_RATE are 0s and at least one of CON_REF_INCL, CON_REF, SCR_SEQ_INCL, and SCR_SEQ is not 0, the extended release message indicates transition to a control hold state.

6. The method of claim 3, wherein if both the fields CON_REF_INCL and CON_REF are 0s, the extended release message indicates transition to the dormant state.

7. The method of claim 1, wherein the first message is an extended release mini message.

8. The method of claim 7, wherein the extended release mini message indicates transition to the control hold state.

9. The method of claim 8, wherein the extended release mini message comprises:
   a CH_IND field indicating a type of a physical channel to be released; and
   a BLOB field including firsthand information about MAC state transition.

10. The method of claim 9, wherein the second message is an extended release response message.

11. The method of claim 1, wherein if the mobile station requests the SCH release, the base station determines the next state to transition to by receiving a third message from the mobile station in the state transition determining step.

12. The method of claim 11, wherein the third message is a peer-to-peer resource control message.

13. The method of claim 12, wherein upon receipt of the peer-to-peer resource control message, the base station determines whether to release the SCH and remain in an active state, or to transition to the control hold state, the suspended state, or the dormant state, based on the received peer-to-peer resource control message.

14. The method of claim 11, wherein the third message is a peer-to-peer resource control mini message.

15. The method of claim 14, wherein upon receipt of the peer-to-peer resource control mini message, the base station determines whether to release the SCH and remain in the active state, or to transition to the control hold state, the suspended state, or the dormant state, based on the received peer-to-peer resource control mini message.

16. A method of releasing an SCH in a mobile station of a CDMA mobile communication system, comprising the steps of:
   determining whether the mobile station has received a first message, indicating release of the SCH and whether to perform state transition, from a base station during packet data communication on the SCH;
   analyzing the first message upon receipt of the first message, releasing the SCH, and continuing the current state or transitioning to a next state; and
   transmitting a second message to the base station after the state transition.

17. The method of claim 16, wherein the first message is an extended release message.

18. The method of claim 17, wherein the extended release message comprises:
   an FPC_PRI_CHAN field indicating a forward channel by which forward inner-loop power control is performed;
   an RPC_CHANNEL field indicating a channel to transmit power control bits;
   a CH_IND field indicating a type of a physical channel to be released;
   a CON_REF field indicating a connection of a service option to a specific mobile station;
   a CON_REF_INCL field indicating whether the CON_REF field is included in the extended release message;
   an SCR_SEQ field for discriminating a suspended state from a dormant state in a signaling layer;
   an SCR_SEQ_INCL field indicating whether the SCR_SEQ field is included in the extended release message;
   a PILOT_GATING_RATE field indicating a gating rate;
   a GATE_RATE_INCL field indicating whether the PILOT_GATING_RATE field is included in the extended release message; and a BLOB field including firsthand information about MAC state transition.

19. The method of claim 18, wherein if CH_IND is not 0 and at least one of CON_REF_INCL, CON_REF, SCR_SEQ_INCL, and SCR_SEQ is not 0, the extended release message indicates a transition to the suspended state.

20. The method of claim 18, wherein if none of CH_IND, GATING_RATE_INCL, and PILOT_GATING_RATE are 0s and at least one of CON_REF_INCL, CON_REF, SCR_SEQ_INCL, and SCR_SEQ is not 0, the extended release message indicates transition to a control hold state.

21. The method of claim 18, wherein both the fields CON_REF_INCL and CON_REF are 0s, the extended release message indicates transition to the dormant state.

22. The method of claim 16, wherein the first message is an extended release mini message.

23. The method of claim 22, wherein the extended release mini message indicates transition to the control hold state.

24. The method of claim 23, wherein the extended release mini message comprises:
    a CH_IND field indicating a type of a physical channel to be released; and
    a BLOB field including firsthand information about MAC state transition.

25. The method of claim 24, wherein the second message is an extended release response message.

26. The method of claim 16, further comprising the step of transmitting a third message requesting release of the SCH and indicating whether a state transition will occur or not to the base station if the packet data transmission on the SCH is discontinued for a predetermined time period.

27. The method of claim 26, wherein the third message is a peer-to-peer resource control message requesting release of the SCH and including information about transition to a control hold state, a suspended state, or a dormant state.

28. The method of claim 27, wherein the peer-to-peer resource control message includes a 16-bit REQ-BLOB field.

29. The method of claim 26, wherein the third message is a peer-to-peer resource control mini message requesting release of the SCH and including information about transition to a control hold state, a suspended state, or a dormant state.

30. An apparatus for releasing an SCH in a base station of a CDMA mobile communication system, comprising:
    a MAC controller that determines a next state to transition to and generates an RC-unlock request signal indicating a release of an SCH and a state transition, upon receipt of an SCH release request during packet data communication on the SCH;
    a resource controller (RC) that generates a signaling (SIG) release request signal upon receipt of the RC-unlock request signal and releases the SCH and resources according to the state transition upon receipt of a SIG-release confirm signal; and
    a SIG controller that generates a first message and transmits the first message to a mobile station in response to the SIG-release request signal, receives a second message as a response message to the first message, and transmits the SIG-release confirm signal to the RC.

31. The apparatus of claim 30, wherein the first message is an extended release message.

32. The apparatus of claim 31, wherein the extended release message comprises:
    an FPC_PRI_CHAN field indicating a forward channel by which forward inner-loop power control is performed;
    an RPC_CHANNEL field indicating a channel to transmit power control bits;
    a CH_IND field indicating a type of a physical channel to be released;
    a CON_REF field indicating a connection of a service option to a specific mobile station;
    a CON_REF_INCL field indicating whether the CON_REF field is included in the extended release message;
    an SCR_SEQ field for discriminating a suspended state from a dormant state in a signaling layer;
    an SCR_SEQ_INCL field indicating whether the SCR_SEQ field is included in the extended release message;
    a PILOT_GATING_RATE field indicating a gating rate;
    a GATE_RATE_INCL field, indicating whether the PILOT_GATING_RATE field is included in the extended release message; and
    a BLOB field including firsthand information about MAC state transition.

33. The apparatus of claim 32, wherein if CH_IND is not 0 and at least one of CON_REF_INCL, CON_REF, SCR_SEQ_INCL, and SCR_SEQ is not 0, the extended release message indicates a transition to the suspended state.

34. The apparatus of claim 32, wherein if none of CH_IND, GATING_RATE_INCL, and PILOT_GATING_RATE are 0s and at least one of CON_REF_INCL, CON_REF, SCR_SEQ_INCL, and SCR_SEQ is not 0, the extended release message indicates transition to a control hold state.

35. The apparatus of claim 32, wherein if both the fields CON_REF_INCL and CON_REF are 0s, the extended release message indicates transition to the dormant state.

36. The apparatus of claim 30, wherein the first message is an extended release mini message.

37. The apparatus of claim 36, wherein the extended release mini message indicates transition to the control hold state.

38. The apparatus of claim 37, wherein the extended release mini message comprises:
    a CH_IND field indicating a type of a physical channel to be released; and
    a BLOB field including firsthand information about MAC state transition.

39. The apparatus of claim 38, wherein the second message is an extended release response message.

40. The apparatus of claim 30, wherein if the mobile station requests the SCH release, the base station determines the next state to transition to by receiving a third message from the mobile station.

41. The apparatus of claim 40, wherein the third message is a peer-to-peer resource control message.

42. The apparatus of claim 41, wherein upon receipt of the peer-to-peer resource control message, the base station determines whether to release the SCH and remain in an active state, or to transition to the control hold state, the suspended state, or the dormant state, based on the received peer-to-peer resource control message.

43. The apparatus of claim 40, wherein the third message is a peer-to-peer resource control mini message.

44. The apparatus of claim 43, wherein upon receipt of the peer-to-peer resource control mini message, the base station determines whether to release the SCH and remain in the active state, or to transition to the control hold state, the suspended state, or the dormant state, based on the received peer-to-peer resource control mini message.

45. An apparatus for releasing an SCH in a mobile station of a CDMA mobile communication system, comprising:

a SIG controller that receives a first message indicating a release of an SCH and a state transition from a base station during packet data communication on the SCH, generates a SIG-release indication signal requesting release of the SCH and resources associated with the state transition, receives a SIG-release response signal as a response for the SIG-release indication signal, and transmits a second message to the base station;

an RC that generates an RC-resource release indication signal in response to the SIG-release indication signal and transmits the SIG-release response signal to the SIG controller; and a MAC controller that receives the RC-resource release indication signal and transitions to a next state.

46. The apparatus of claim 45, wherein the first message is an extended release message.

47. The apparatus of claim 46, wherein the extended release message comprises:

an FPC_PRI_CHAN field indicating a forward channel by which forward inner-loop power control is performed;

an RPC_CHANNEL field indicating a channel to transmit power control bits;

a CH_IND field indicating a type of a physical channel to be released;

a CON_REF field indicating a connection of a service option to a specific mobile station;

a CON_REF_INCL field indicating whether the CON_REF field is included in the extended release message;

an SCR_SEQ field for discriminating a suspended state from a dormant state in a signaling layer;

an SCR_SEQ_INCL field indicating whether the SCR_SEQ field is included in the extended release message;

a PILOT_GATING_RATE field indicating a gating rate;

a GATE_RATE_INCL field indicating whether the PILOT_GATING_RATE field is included in the extended release message; and a BLOB field including firsthand information about MAC state transition.

48. The apparatus of claim 47, wherein if CH_IND is not 0 and at least one of CON_REF_INCL, CON_REF, SCR_SEQ_INCL, and SCR_SEQ is not 0, the extended release message indicates a transition to the suspended state.

49. The apparatus of claim 47, wherein if none of CH_IND, GATING_RATE_INCL, and PILOT_GATING_RATE are 0s and at least one of CON_REF_INCL, CON_REF, SCR_SEQ_INCL, and SCR_SEQ is not 0, the extended release message indicates transition to a control hold state.

50. The apparatus of claim 47, wherein both the fields CON_REF_INCL and CON_REF are 0s, the extended release message indicates a transition to the dormant state.

51. The apparatus of claim 45, wherein the first message is an extended release mini message.

52. The apparatus of claim 51, wherein the extended release mini message indicates transition to the control hold state.

53. The apparatus of claim 52, wherein the extended release mini message comprises:

a CH_IND field indicating a type of a physical channel to be released; and a BLOB field including firsthand information about MAC state transition.

54. The apparatus of claim 53, wherein the second message is an extended release response message.

55. The apparatus of claim 45, wherein the mobile station transmits a third message requesting release of the SCH and indicating whether a state transition will occur or not to the base station if the packet data transmission on the SCH is discontinued for a predetermined time period.

56. The apparatus of claim 55, wherein the third message is a peer-to-peer resource control message requesting release of the SCH and including information about transition to a control hold state, a suspended state, or a dormant state.

57. The apparatus of claim 56, wherein the peer-to-peer resource control message includes a 16-bit REQ-BLOB field.

58. The apparatus of claim 55, wherein the third message is a peer-to-peer resource control mini message requesting release of the SCH and including information about transition to a control hold state, a suspended state, or a dormant state.

* * * * *